US012752385B2

(12) United States Patent
Doi et al.

(10) Patent No.: US 12,752,385 B2
(45) Date of Patent: Oct. 6, 2026

(54) MACHINE TOOL

(71) Applicant: DMG MORI CO., LTD., Nara (JP)

(72) Inventors: Takafumi Doi, Nara (JP); Katsuhito Miyahara, Nara (JP); Tatsuhiko Kuriya, Nara (JP)

(73) Assignee: DMG MORI CO., LTD., Nara (JP)

( * ) Notice: Subject to any disclaimer, the term of this patent is extended or adjusted under 35 U.S.C. 154(b) by 627 days.

(21) Appl. No.: 17/924,544

(22) PCT Filed: May 14, 2020

(86) PCT No.: PCT/JP2020/019224

§ 371 (c)(1),
(2) Date: Nov. 10, 2022

(87) PCT Pub. No.: WO2021/229739

PCT Pub. Date: Nov. 18, 2021

(65) Prior Publication Data

US 2023/0173626 A1 Jun. 8, 2023

(51) Int. Cl.
*B23Q 11/00* (2006.01)
*B23Q 1/00* (2006.01)
(Continued)

(52) U.S. Cl.
CPC ........ *B23Q 11/0067* (2013.01); *B23Q 1/0009* (2013.01); *B23Q 1/015* (2013.01);
(Continued)

(58) Field of Classification Search
CPC .. B23Q 1/0009; B23Q 1/015; B23Q 11/0053; B23Q 11/0067; B23Q 11/0075; B23Q 2701/01; B23B 7/10; B23B 25/04; Y10S 82/2566; Y10S 82/901; Y10T 29/5109; Y10T 82/2566
(Continued)

(56) References Cited

U.S. PATENT DOCUMENTS 2,793,972 A * 5/1957 Ganslein ................ E04C 2/365 428/116
7,387,478 B2 * 6/2008 Anderson .......... B23Q 11/0067 409/134
(Continued)

FOREIGN PATENT DOCUMENTS

CN 107243777 A 10/2017
CN 206717529 U * 12/2017 ............ B23Q 37/00
(Continued)

OTHER PUBLICATIONS

EPO Machine Translation of WO2020255455A1—Kawasumi Masahiro; "Machine Tool"; Dec. 24, 2020.*

*Primary Examiner* — Sunil K Singh
*Assistant Examiner* — Michael Vitale
(74) *Attorney, Agent, or Firm* — IP Business Solutions, LLC.

(57) ABSTRACT

The machine tool includes a coolant tank provided in front of a bed in a machine front direction, a wire/pipe housing box provided at a first position in front of the coolant tank in the machine front direction, and a support arm capable of supporting the wire/pipe housing box retracted from the first position to a second position higher than the coolant tank.

9 Claims, 8 Drawing Sheets

(51) Int. Cl.
*B23Q 1/01* (2006.01)
*B23Q 11/10* (2006.01)

(52) U.S. Cl.
CPC ...... *B23Q 11/0053* (2013.01); *B23Q 11/0075* (2013.01); *Y10T 29/5109* (2015.01)

(58) Field of Classification Search
USPC ..................................... 82/149, 901; 29/27 R
See application file for complete search history.

(56) References Cited

U.S. PATENT DOCUMENTS

| | | | | |
|---|---|---|---|---|
| 2004/0065046 | A1 | 4/2004 | Leder et al. | |
| 2009/0121113 | A1* | 5/2009 | Yasuda | B23Q 1/58<br>82/121 |
| 2009/0290948 | A1 | 11/2009 | Balser | |
| 2019/0030671 | A1* | 1/2019 | Tooyama | B23Q 11/1015 |
| 2022/0105599 | A1* | 4/2022 | Kawasumi | B23Q 11/0078 |
| 2022/0314385 | A1* | 10/2022 | Naramoto | B23Q 11/1015 |
| 2024/0116149 | A1* | 4/2024 | Miyahara | B23Q 11/08 |

FOREIGN PATENT DOCUMENTS

| | | | | | |
|---|---|---|---|---|---|
| CN | 109318037 | A | | 2/2019 | |
| CN | 209831076 | U | * | 12/2019 | B23Q 37/00 |
| CN | 114178908 | A | * | 3/2022 | B23Q 37/00 |
| JP | H0230401 | A | | 1/1990 | |
| JP | H05-039843 | U | | 5/1993 | |
| JP | 2830450 | B2 | * | 12/1998 | |
| JP | 2004351592 | A | * | 12/2004 | B23Q 37/00 |
| JP | 3952160 | B2 | * | 8/2007 | B23Q 37/00 |
| JP | 2010-247328 | A | | 11/2010 | |
| TW | I597116 | B | | 9/2017 | |
| WO | WO-2020255455 | A1 | * | 12/2020 | B23B 3/065 |

* cited by examiner

MACHINE TOOL

TECHNICAL FIELD

The present invention relates to a machine tool.

BACKGROUND ART

For example, Japanese Patent Laying-Open No. 2-30401 (PTL 1) discloses a two main spindle-opposed type CNC lathe that includes a slant base, a first spindle and a second spindle which are disposed opposite to each other for rotating a workpiece, and a chip housing box which is provided in front of the base in a machine front direction.

CITATION LIST

Patent Literature

PTL 1: Japanese Patent Laying-Open No. 2-30401

SUMMARY OF INVENTION

Technical Problem

As disclosed in PTL 1, there is known a machine tool in which a chip housing box (a coolant tank) is provided in front of a base (a bed) in the machine front direction. In such a machine tool, a structure such as a box configured to house pipes or wires, or a foot stool that forms a scaffold for an operator may be provided in front of the coolant tank in the machine front direction. In this case, the access to the coolant tank by the operator from the machine front direction is impeded by the structure such as the box or the foot stool.

The present invention has been accomplished in view of the aforementioned problems, and an object thereof is to provide a machine tool that enables an easy access to a coolant tank from a machine front direction.

Solution to Problem

A machine tool according to the present invention includes a coolant tank provided in front of a bed in a machine front direction, a structure provided at a first position in front of the coolant tank in the machine front direction, and a support capable of supporting the structure retracted from the first position to a second position higher than the coolant tank.

Note that the "machine front direction" refers to a horizontal direction from a machining area of the machine tool toward a side where an operator stands to access the machining area of the machine tool.

According to the machine tool configured as described above, the structure retracted from the first position to the second position is supported by the support, whereby the access to the coolant tank from the machine front direction is enabled.

In an aspect, the structure is connected to the support so as to be operable between the first position and the second position.

According to the machine tool configured as described above, it is possible to easily move the structure between the first position and the second position.

In an aspect, the structure is connected to the support so as to be rotatable about a first axis extending in a machine left-right direction.

The "machine left-right direction" refers to a horizontal direction orthogonal to the machine front direction.

According to the machine tool configured as described above, it is possible to further easily move the structure between the first position and the second position.

In an aspect, the first axis is disposed at a position higher than the coolant tank.

According to the machine tool configured as described above, it is possible to easily achieve a configuration to retract the structure to the second position higher than the coolant tank.

In an aspect, the machine tool further includes a restriction member that restricts the motion of the structure from the second position to the first position.

According to the machine tool configured as described above, it is possible to prevent the structure from being unintentionally moved from the second position to the first position.

In an aspect, the structure has an upper surface, the upper surface extends into a band shape, the longitudinal direction of which is identical to the machine left-right direction, and the upper surface is a horizontal surface when the structure is positioned at the first position.

According to the machine tool configured as described above, when the upper surface of the structure is used as a step surface that forms a scaffold for an operator, the structure retracted from the first position to the second position is supported by the support, whereby the access to the coolant tank from the machine front direction is enabled.

In an aspect, the machine tool further includes a work spindle that rotates a workpiece about a second axis extending in the machine left-right direction. The upper surface is disposed at a position lower than the second axis and higher than the coolant tank when the structure is positioned at the first position.

According to the machine tool configured as described above, when the upper surface of the structure is used as a step surface that forms a scaffold for the operator, the operator's hand can be placed at a favorable height with respect to the workpiece held by the work spindle.

In an aspect, the structure is formed with an internal space. The machine tool includes at least one of a wire and a pipe housed in the internal space.

According to the machine tool configured as described above, when the internal space of the structure is used as a space for housing the wires and/or the pipes, the structure retracted from the first position to the second position is supported by the support, whereby the access to the coolant tank from the machine front direction is enabled.

In an aspect, the coolant tank includes a tank body that has an elongated shape, the longitudinal direction of which is identical to the machine left-right direction in a top view, and is configured to store coolant, and a tire attached to the tank body.

According to the machine tool configured as described above, by retracting the structure from the first position to the second position, it is possible to pull the coolant tank in the machine front direction.

Advantageous Effects of Invention

As described above, according to the present invention, it is possible to provide a machine tool that enables an easy access to the coolant tank from the machine front direction.

DESCRIPTION OF EMBODIMENTS

Figure 1:
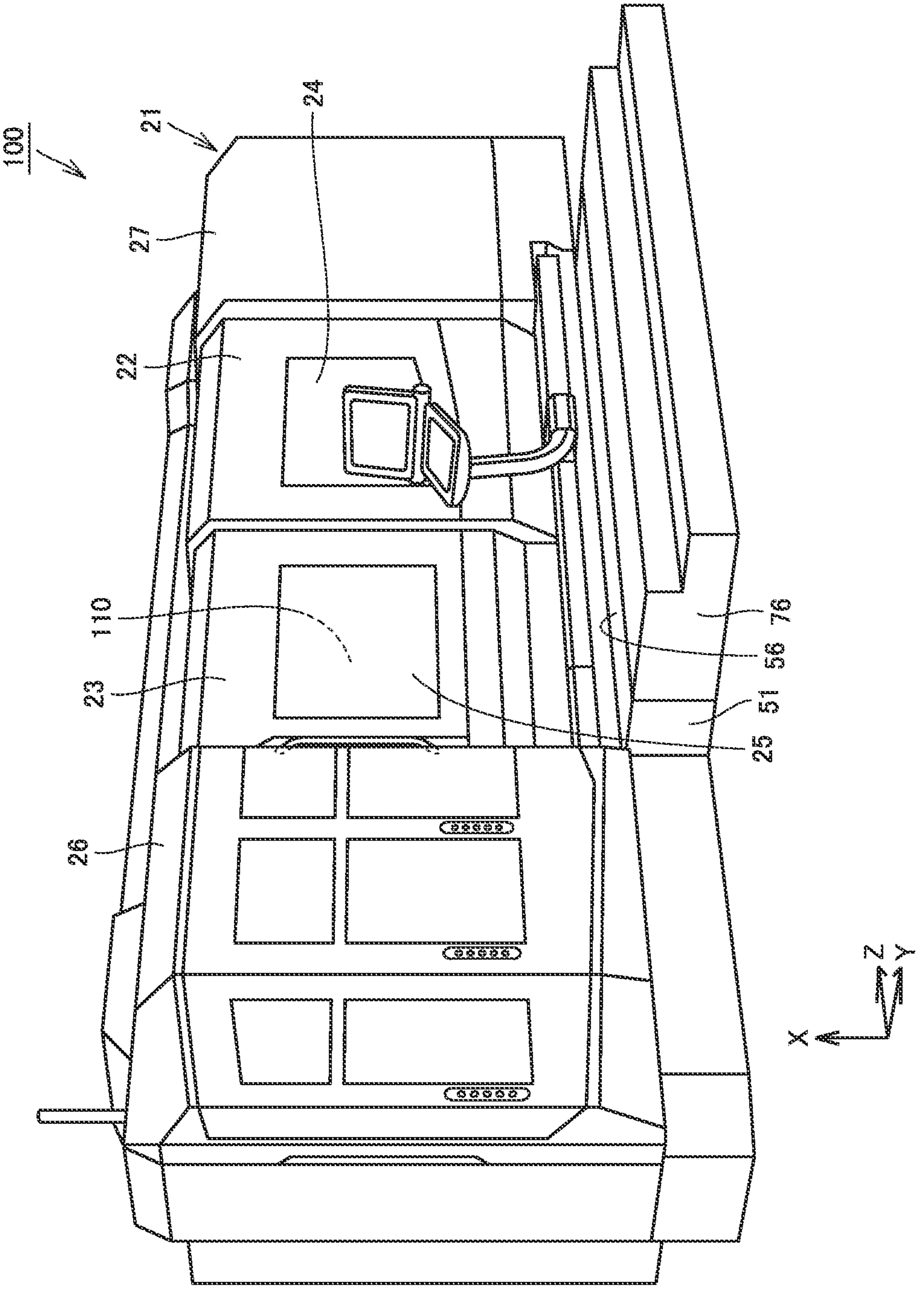
FIG. 1 is a perspective view illustrating a machine tool according to a first embodiment of the present invention.

Embodiments of the present invention will be described with reference to the drawings. In the following drawings, the same or corresponding members are denoted by the same reference numerals.

First Embodiment

FIG. 1 is a perspective view illustrating a machine tool according to a first embodiment of the present invention. With reference to FIG. 1, a machine tool 100 according to the present embodiment is an NC (Numerically Control) machine tool in which various operations for machining a workpiece are automated by a computer via numerical control. The machine tool 100 is a composite machine capable of performing a turning operation by using a fixed tool and a milling operation by using a rotating tool.

In the present specification, an axis which is parallel to the left-right direction (width direction) of the machine tool 100 and extends in the horizontal direction is referred to as a "Z axis", an axis which is parallel to the front-rear direction (depth direction) of the machine tool 100 and extends in the horizontal direction is referred to as a "Y axis", and an axis which extends in the vertical direction is referred to as an "X axis". In FIG. 1, the rightward direction is referred to as a "+Z axis direction", and the leftward direction is referred to as a "−Z axis direction". In FIG. 1, the forward direction of the page is referred to as a "+Y axis direction" and the backward direction thereof is referred to as a "−Y axis direction". The +Y axis direction corresponds to the machine front direction. In FIG. 1, the upward direction is referred to as "+X axis direction", and the downward direction is referred to as "−X axis direction". The X axis, the Y axis, and the Z axis are orthogonal to each other.

The machine tool 100 includes a cover body 21. The cover body 21 defines a machining area 110, and forms an outer appearance of the machine tool 100. The machining area 110 is a space where a workpiece is machined, and is substantially sealed so as to prevent foreign matters such as chips or cutting oil from flying to the outside of the machining area 110 during the machining of the workpiece.

The cover body 21 includes a first door 22 and a second door 23 as doors, a side cover 27, and a magazine cover 26.

The cover body 21 is provided with openings that make the machining area 110 open toward the +Y axis direction (the machine front direction) and the +X axis direction (the upward direction). Each of the first door 22 and the second door 23 is disposed in an opening provided in the cover body 21. The side cover 27 and the magazine cover 26 are provided on both sides of the opening provided in the cover body 21 in the Z axis direction. A work spindle (an opposing work spindle) for rotating the workpiece, a tailstock for supporting a rotation center of the workpiece, and the like are housed inside the side cover 27. A magazine or the like for storing a plurality of tools to be used for machining a workpiece is housed inside the magazine cover 26.

The first door 22 and the second door 23 are slidable between a closed position where the opening provided in the cover body 21 is closed and an open position where the opening provided in the cover body 21 is opened. The first door 22 and the second door 23 are slidable in the Z axis direction. When the first door 22 and the second door 23 are slid to the open position, the first door 22 and the second door 23 overlap the side cover 27 in the Y axis direction.

The first door 22 and the second door 23 may be manual doors that are slid manually, or may be automatic doors that are slid by an actuator such as a cylinder or a motor.

Figure 2:
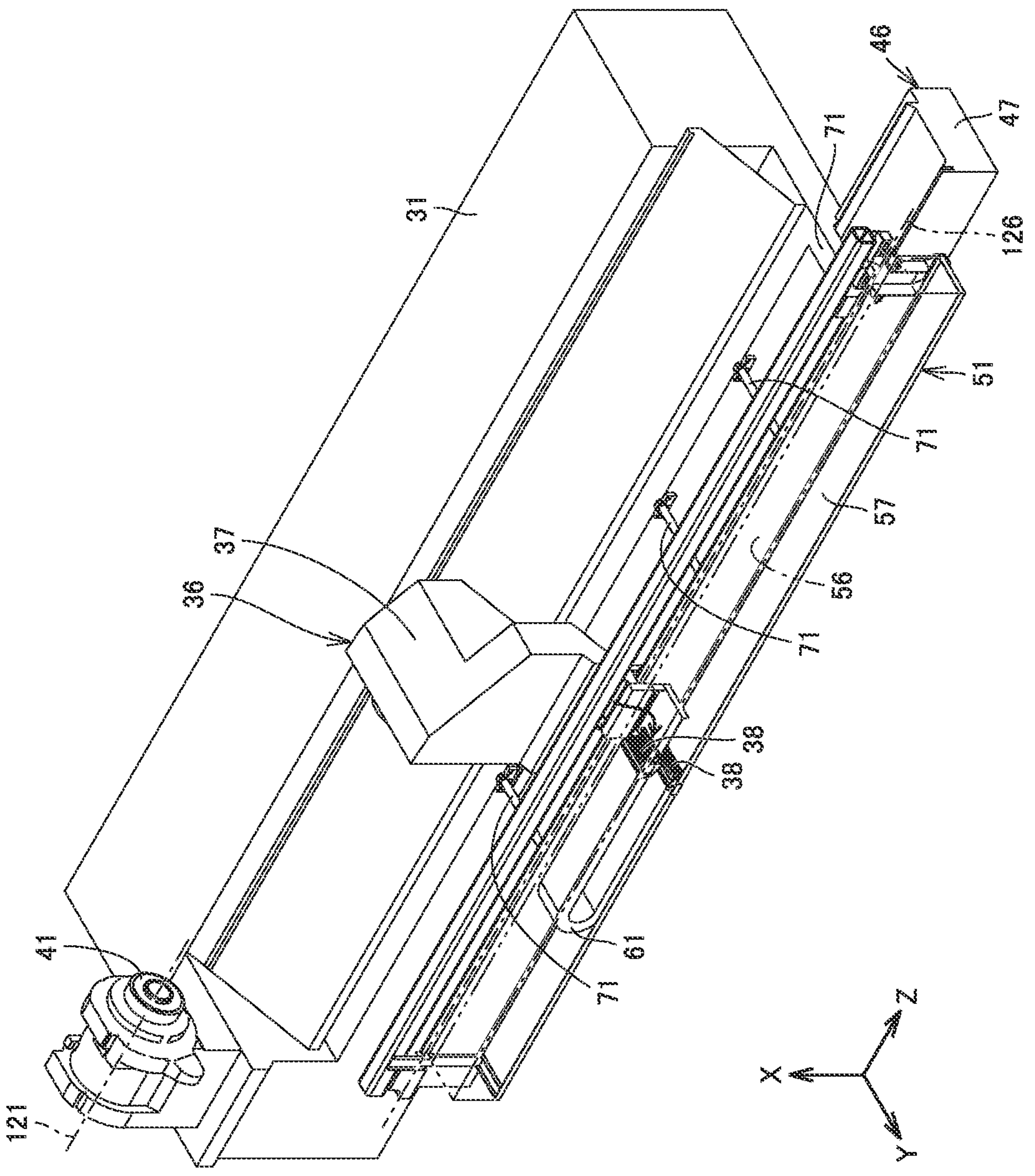
FIG. 2 is a perspective view partially illustrating an internal structure of the machine tool of FIG. 1.
Figure 3:
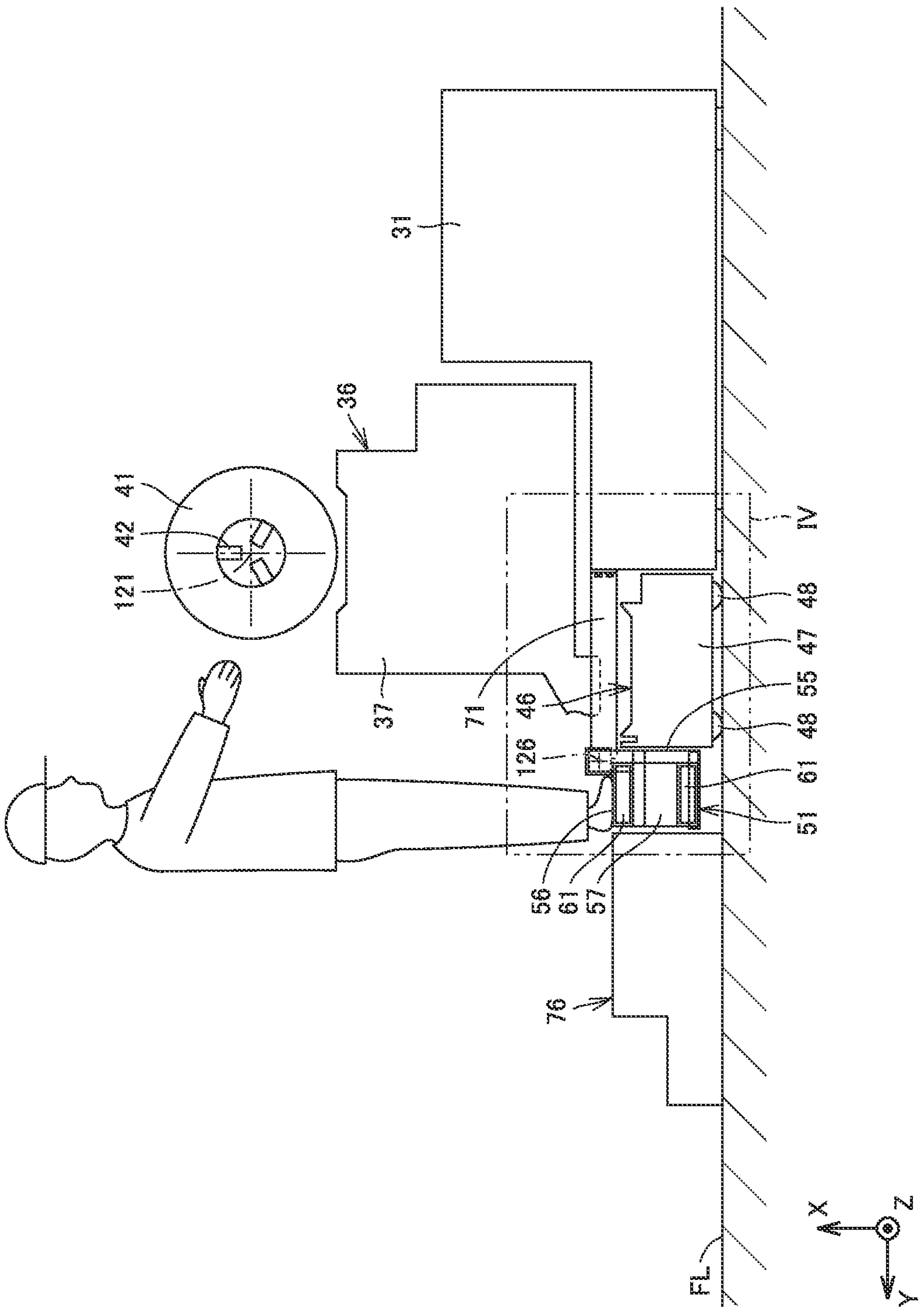
FIG. 3 is a side view illustrating the machine tool of FIG. 2.

FIG. 2 is a perspective view partially illustrating an internal structure of the machine tool of FIG. 1. FIG. 3 is a side view illustrating the machine tool of FIG. 2. With reference to FIGS. 1 to 3, the machine tool 100 further includes a bed 31, a work spindle 41, and a tool rest 36.

The bed 31 is a base member for supporting the work spindle 41, the tool rest 36, a tool spindle (not shown) and the like, and is disposed on a floor FL of a factory or the like. In a top view, the bed 31 has an elongated shape (a rectangular shape), the short direction of which is identical to the Y axis direction and the longitudinal direction of which is identical to the Z axis direction. The bed 31 is made of metal such as cast iron.

The work spindle 41 is configured to hold a workpiece. The work spindle 41 has chuck claws 42 (see FIG. 3) configured to detachably hold the workpiece. The work spindle 41 is mainly provided to rotate the workpiece during a turning operation by using a fixed tool. The work spindle 41 is provided so as to be rotatable about a rotation center axis 121 (a second axis) parallel to the machine left-right direction (the Z axis direction). The work spindle 41 is fixed to the bed 31.

The opposing work spindle arranged inside the side cover 27 is arranged opposite to the work spindle 41 in the Z axis direction.

The tool rest 36 is configured to hold a plurality of tools. The tool rest 36 has a so-called turret type, and is radially mounted with a plurality of tools to perform a turning index operation. The tool rest 36 includes a turning member (not shown) and a tool rest base 37. The turning member is rotatable about a rotation center axis parallel to the Z axis. Tool holders for holding tools are mounted at positions spaced apart from each other in the circumferential direction of the rotation center axis. The tool rest base 37 supports the turning member.

The tool rest 36 is disposed on the bed 31. The tool rest 36 is provided between the work spindle 41 and the opposing work spindle (not shown) in the Z axis direction. The tool rest 36 is slidable at least in the Z axis direction by various kinds of feed mechanisms, guide mechanisms, servo motors, and the like.

The machine tool 100 further includes a coolant tank 46. The coolant tank 46 is disposed on the floor FL. The coolant tank 46 is disposed side by side with the bed 31 in the machine front-rear direction (the Y axis direction). The coolant tank 46 is provided in front of the bed 31 in the machine front direction. The coolant tank 46 is disposed opposite to the bed 31 in the Y axis direction.

The coolant tank 46 is configured to store coolant to be used for machining a workpiece in the machining area 110.

The coolant tank 46 includes a tank body 47 and a plurality of tires 48. In a top view, the tank body 47 has an elongated shape, the longitudinal direction of which is identical to the Z axis direction (the machine left-right direction). In the top view, the tank body 47 has a rectangular shape, the short direction of which is identical to the Y axis direction (the machine front-rear direction) and the longitudinal direction of which is identical to the Z axis direction (the machine left-right direction). The plurality of tires 48 are attached to the tank body 47. The plurality of tires 48 are spaced apart from each other and attached to a bottom portion of the tank body 47.

The coolant tank 46 is provided at a position lower than the work spindle 41 and the tool rest 36. The coolant tank 46 is provided at a position partially overlapping the tool rest 36 in a top view.

The machine tool 100 further includes a wire/pipe housing box 51, a wire/pipe 38, a cable bear (registered trademark) 61, and a foot stool 76.

The wire/pipe housing box 51 is provided side by side with the coolant tank 46 in the machine front-rear direction (Y axis direction). The wire/pipe housing box 51 is provided in front of the coolant tank 46 in the machine front direction. The wire/pipe housing box 51 is disposed opposite to the coolant tank 46 in the Y axis direction.

The wire/pipe housing box 51 forms an internal space 57. The wire/pipe housing box 51 has an elongated shape, the longitudinal direction of which is identical to the Z axis direction. The range in which the wire/pipe housing box 51 extends in the Z axis direction includes a sliding range of the tool rest 36 in the Z axis direction.

The wire/pipe housing box 51 has an upper surface 56. The upper surface 56 is a horizontal surface. The upper surface 56 faces upward (the +X axis direction). The upper surface 56 extends in a band shape, the longitudinal direction of which is identical to the machine left-right direction (the Z axis direction). As illustrated in FIG. 1, the upper surface 56 is disposed immediately below the first door 22 and the second door 23 when they are slid to the closed position. The upper surface 56 forms a scaffold for the operator at a position higher than the floor FL.

The upper surface 56 is disposed at a position lower than the rotation center axis 121 of the work spindle 41 and higher than the coolant tank 46.

The wire/pipe housing box 51 further includes an opposing member 55. The opposing member 55 is disposed opposite to the coolant tank 46 in the Y axis direction. The opposing member 55 faces toward the −Y axis direction.

The wire/pipe 38, which is at least one of a wire and a pipe, is housed in the internal space 57. The wire/pipe 38 extends between the tool rest 36 (the tool rest base 37) and the wire/pipe housing box 51. The wire/pipe 38 includes at least one of an electrical wire, an air pipe, a lubricating oil pipe, and a hydraulic pipe.

The wire/pipe 38 is drawn out from the tool rest 36 (the tool rest base 37) in the +Y axis direction. The wire/pipe 38 is bent toward the −X axis direction (the downward direction) and guided into the internal space 57. The wire/pipe 38 is arranged along the Z axis direction in the inner space 57.

The cable bear 61 is housed in the internal space 57. The wire/pipe 38 is inserted through the cable bear 61 in the inner space 57. One end of the cable bear 61 is connected to the tool rest 36 (the tool rest base 37). The cable bear 61 can be stroked in the Z axis direction along with the sliding of the tool rest 36 in the Z axis direction.

The foot stool 76 is disposed on the floor FL. The foot stool 76 is provided side by side with the wire/pipe housing box 51 in the machine front-rear direction (the Y axis direction). The foot stool 76 is provided in front of the wire/pipe housing box 51 in the machine front direction. The foot stool 76 is provided opposite to the wire/pipe housing box 51 in the Y axis direction. The foot stool 76 forms a scaffold for the operator at a position higher than the floor FL.

Figure 4:
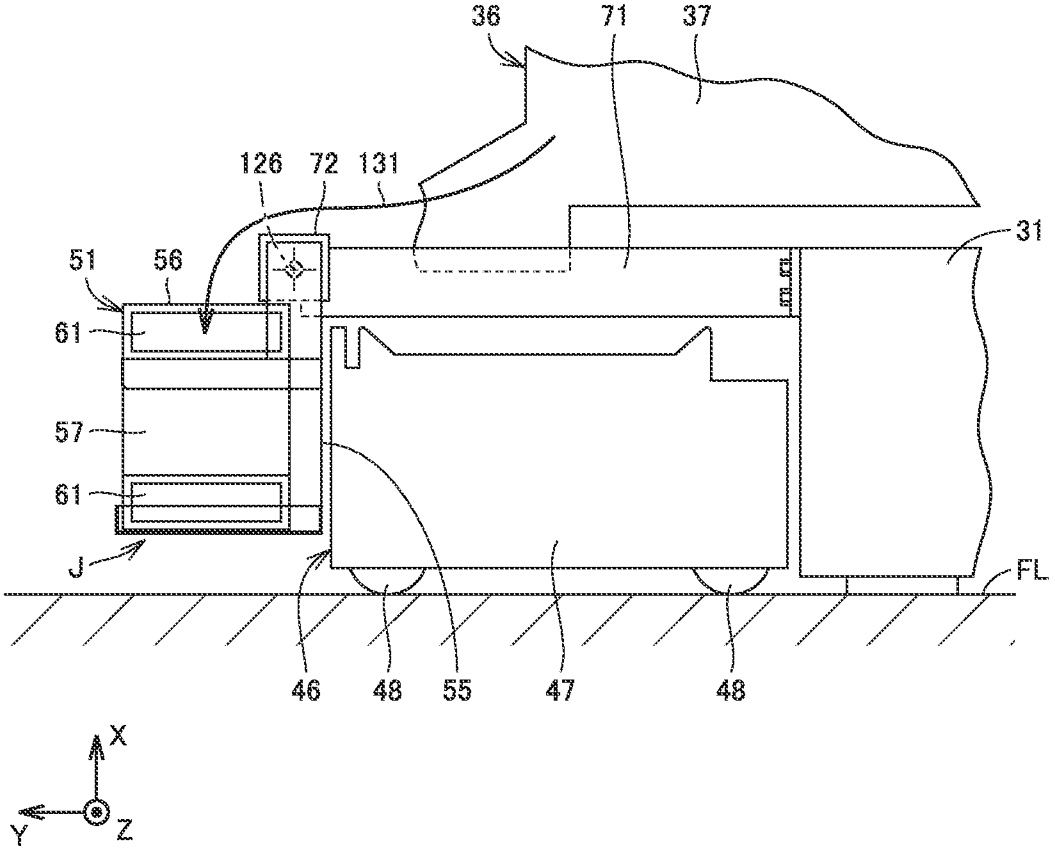
FIG. 4 is a side view for explaining the operation of a wire/pipe housing box.
Figure 5:
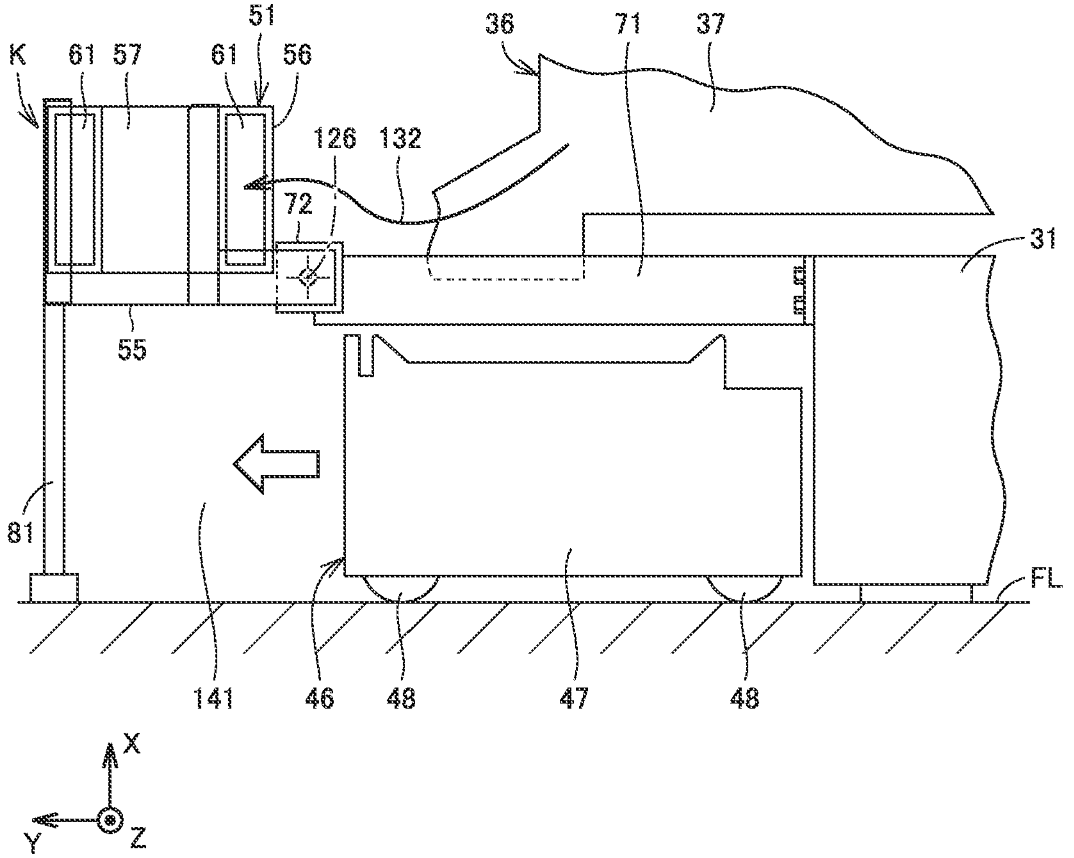
FIG. 5 is another side view for explaining the operation of the wire/pipe housing box.

FIGS. 4 and 5 are side views for explaining the operation of the wire/pipe housing box. FIG. 4 illustrates the machine tool enclosed by a two-dot chain line IV in FIG. 3.

With reference to FIGS. 2 to 5, the machine tool 100 further includes a support arm 71. As illustrated in FIG. 5, the support arm 71 can support the wire/pipe housing box 51 retracted from a first position J (the position illustrated in FIGS. 2 to 4) in front of the coolant tank 46 in the machine front direction to a second position K higher than the coolant tank 46.

The support arm 71 extends in an arm shape in the Y axis direction. The support arm 71 extends from the bed 31 in the machine front direction, and the wire/pipe housing box 51 is supported at a distal end of the support arm 71. The support arm 71 is provided above the coolant tank 46. The support arm 71 is made of metal. The support arm 71 is fastened to the bed 31 using a bolt or the like. The support arm 71 may be integrated with the bed 31.

As illustrated in FIG. 2, the machine tool 100 includes a plurality of support arms 71. The plurality of support arms 71 are arranged at intervals in the Z axis direction.

With reference to FIGS. 4 and 5, the wire/pipe housing box 51 is connected to the support arm 71 so as to be movable between the first position J and the second position K. The wire/pipe housing box 51 is connected to the support arm 71 so as to be rotatable about a rotation center axis 126 (the first axis) extending in the machine left-right direction (the Z axis direction).

The support arm 71 has a connection member 72. The connection member 72 is provided at an end portion of the support arm 71 in the +Y axis direction. The wire/pipe housing box 51 is connected to the connection member 72 so as to be rotatable about the rotation center axis 126. The rotation center axis 126 is disposed at a position higher than the coolant tank 46. The rotation center axis 126 is provided in front of the coolant tank 46 in the machine front direction.

The wire/pipe housing box 51 rotates by 90° around the rotation center axis 126 between the first position J and the second position K.

As illustrated in FIG. 5, when the wire/pipe housing box 51 is arranged at the second position K, the upper surface 56 faces the −Y axis direction. The upper surface 56 is disposed opposite to the tool rest 36 in the Y axis direction. The opposing member 55 is disposed opposite to the floor FL in the Z axis direction (the vertical direction). The opposing member 55 corresponds to a lowermost portion of the wire/pipe housing box 51 positioned at the lowest height among the wire/pipe housing box 51. The opposing member 55 is positioned higher than the coolant tank 46.

A space 141 is provided between the floor FL and the wire/pipe housing box 51 (the opposing member 55). The space 141 is opened toward the machine front direction when the foot stool 76 is removed from the floor FL.

The machine tool 100 further includes a stopper 81 (a restriction member). The stopper 81 restricts the rotation motion of the wire/pipe housing box 51 from the second position K to the first position J.

The stopper 81 has a pole shape extending in the vertical direction. The stopper 81 is interposed between the floor FL and the wire/pipe housing box 51. The stopper 81 is provided at a position away from the rotation center axis 126 in the radial direction of the rotation center axis 126. When the machine tool 100 is viewed in the Y axis direction, the stopper 81 is provided at a position shifted from the coolant tank 46 in the Z axis direction. The stopper 81 restricts the rotation motion of the wire/pipe housing box 51 from the second position K toward the first position J by using the weight of the wire/pipe housing box 51.

The restriction member of the present invention is not limited to the stopper 81 described above, and may be a latch structure provided around the rotation center axis 126 and configured to allow the rotation motion of the wire/pipe housing box 51 from the first position J toward the second position K, and to restrict the rotation motion of the wire/pipe housing box 51 from the second position K toward the first position J.

The motion of the wire/pipe housing box 51 between the first position J and the second position K is not limited to the rotation motion, and may be, for example, a vertical linear motion. In this case, the wire/pipe housing box 51 may be supported by a linear guide that guides the wire/pipe housing box 51 in the vertical direction.

In some cases, the coolant tank 46 is required to be pulled out from the position in front of the bed 31 in the machine front direction so as to clean the inside of the tank body 47 or to supply coolant to the tank body 47. However, when the coolant tank 46 has an elongated shape, the longitudinal direction of which is identical to the axial direction (the machine left-right direction) of the rotation center axis 121 of the work spindle 41, it is necessary to secure a substantially large space on a lateral side of the machine tool 100 so as to pull out the coolant tank 46 in the machine left-right direction.

On the contrary, in the machine tool 100 according to the present embodiment, by retracting the wire/pipe housing box 51 from the first position J in front of the coolant tank 46 to the second position K higher than the coolant tank 46, it is possible to easily pull out the coolant tank 46 through the space 141 to the machine front position, which makes it possible to improve the workability of the coolant tank 46 during maintenance.

The wire/pipe housing box 51 is connected to the support arm 71 so as to be movable between the first position J and the second position K. The wire/pipe housing box 51 is connected to the support arm 71 so as to be rotatable about the rotation center axis 126 extending in the machine left-right direction. According to this configuration, since it is easy to move the wire/pipe housing box 51 between the first position J and the second position K, it is possible to further improve the workability of the coolant tank 46 during maintenance.

The rotation center axis 126 is disposed at a position higher than the coolant tank 46. With this configuration, when the wire/pipe housing box 51 is rotated about the rotation center axis 126, the space 141 for drawing out the coolant tank 46 can be easily provided below the wire/pipe housing box 51.

Further, as illustrated in FIGS. 4 and 5, since the internal space 57 in which the wire/pipe 38 is housed is only moved in the circumferential direction of the rotation center axis 126 by the rotation motion of the wire/pipe housing box 51, it is possible to prevent a large change in the wring route of the wire/pipe 38 from the tool rest 36 toward the internal space 57 (the wiring route of the wire/pipe 38 from the tool rest 36 to the inner space 57 is indicated by an arrow 131 in FIG. 4 and an arrow 132 in FIG. 5).

Further, the wire/pipe housing box 51 is provided with a stopper 81 that restricts the rotation motion of the wire/pipe housing box 51 from the second position K toward the first position J. With this configuration, it is possible to prevent the wire/pipe housing box 51 from being unintentionally rotated from the second position K toward the first position J, which makes it possible to perform the operation of drawing out the coolant tank 46 safely.

Figure 6:
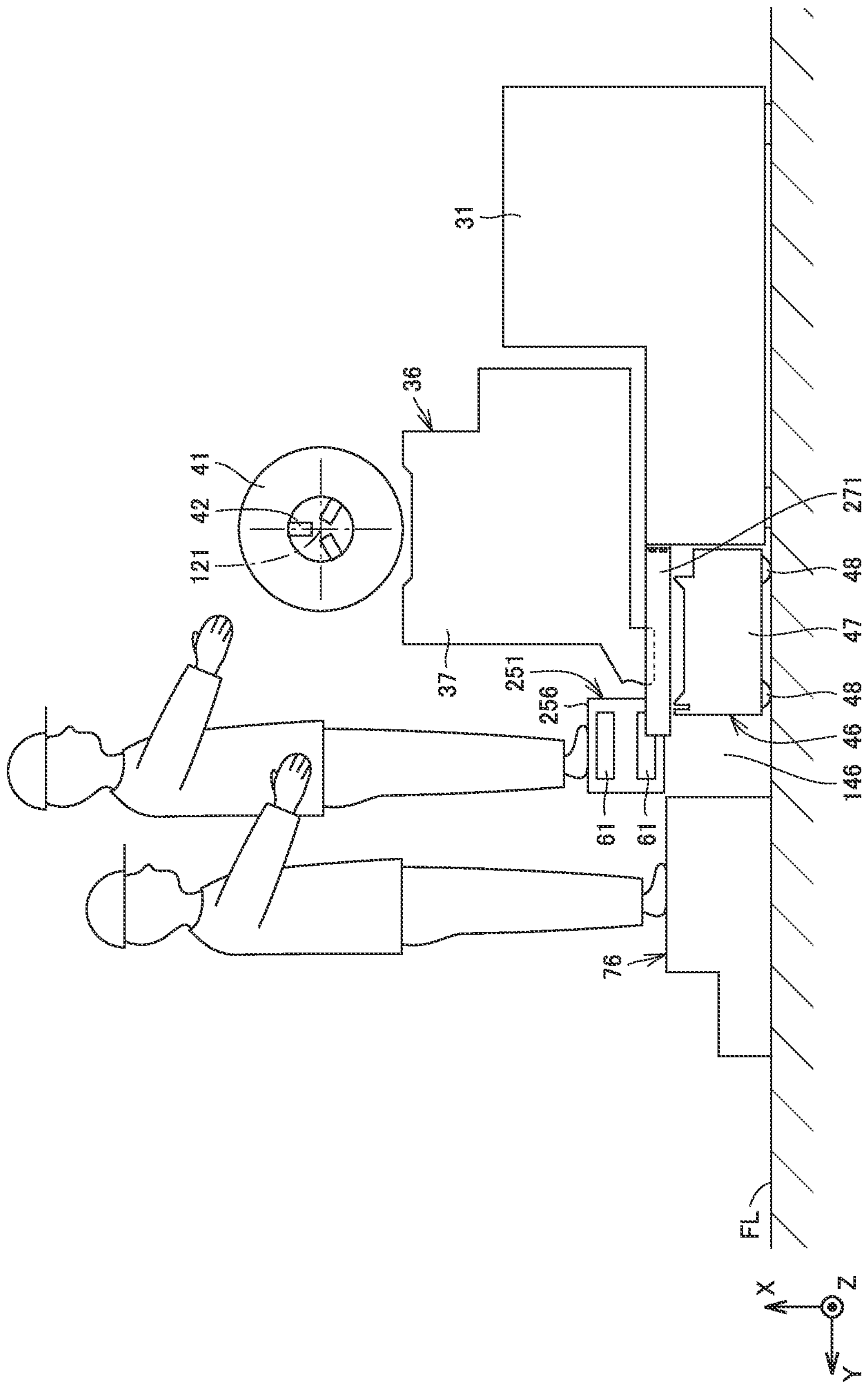
FIG. 6 is a side view illustrating a machine tool according to a comparative example.

FIG. 6 is a side view illustrating a machine tool according to a comparative example. FIG. 6 corresponds to FIG. 3. With reference to FIG. 6, in this comparative example, a wire/pipe housing box 251 is supported by a support arm 271 at a position in front of the tool rest 36 in the machine front direction. A space 146 for drawing out the coolant tank 46 is provided between the floor FL and the wire/pipe housing box 251.

In such a comparative example, when an operator stands on the upper surface 256 of the wire/pipe housing box 251 and attempts to access the machining area 110, the position of the operator's hand is too high as compared with the position of the workpiece held by the work spindle 41. Further, when the operator stands on the foot stool 76 and attempts to access the machining area 110, the position of the operator's hand is away from the position of the workpiece held by the work spindle 41 in the Y axis direction. In any case, it is concerned that the operator is forced to take an unusual posture to work, which impairs the workability of the work spindle 41 or the workpiece held by the work spindle 41.

On the contrary, in the present embodiment, with reference to FIG. 3, the upper surface 56 of the wire/pipe housing box 51 provided in front of the coolant tank 46 in the machine front direction can be used as a step surface that forms a scaffold for an operator. Thereby, is it possible to bring the operator closer to the workpiece held by the work spindle 41, and it is possible to place the operator's hand at a suitable height with respect to the workpiece held by the work spindle 41.

Hereinafter, the machine tool 100 according to the first embodiment of the present invention described above will be summarized. The machine tool 100 according to the present embodiment includes a coolant tank 46 provided in front of a bed 31 in a machine front direction, a wire/pipe housing box 51 which serves as a structure provided at a first position J in front of the coolant tank 46 in the machine front direction, and a support arm 71 which serves as a support capable of supporting the wire/pipe housing box 51 retracted from the first position J to a second position K higher the coolant tank 46.

According to the machine tool 100 of the first embodiment of the present invention configured as described above, by retracting the wire/pipe housing box 51 from the first position J in front of the coolant tank 46 in the machine front direction to the second position K higher than the coolant tank 46, it is possible to easily access the coolant tank 46 from the machine front direction.

The machine tool according to the present invention is not limited to a composite machine, and may be, for example, a lathe, a vertical machining center or a horizontal machining center, or an AM/SM hybrid machine capable of performing AM (Additive Manufacturing) machining on a workpiece and performing SM (Subtractive Manufacturing) machining on a workpiece.

Second Embodiment

Figure 7:
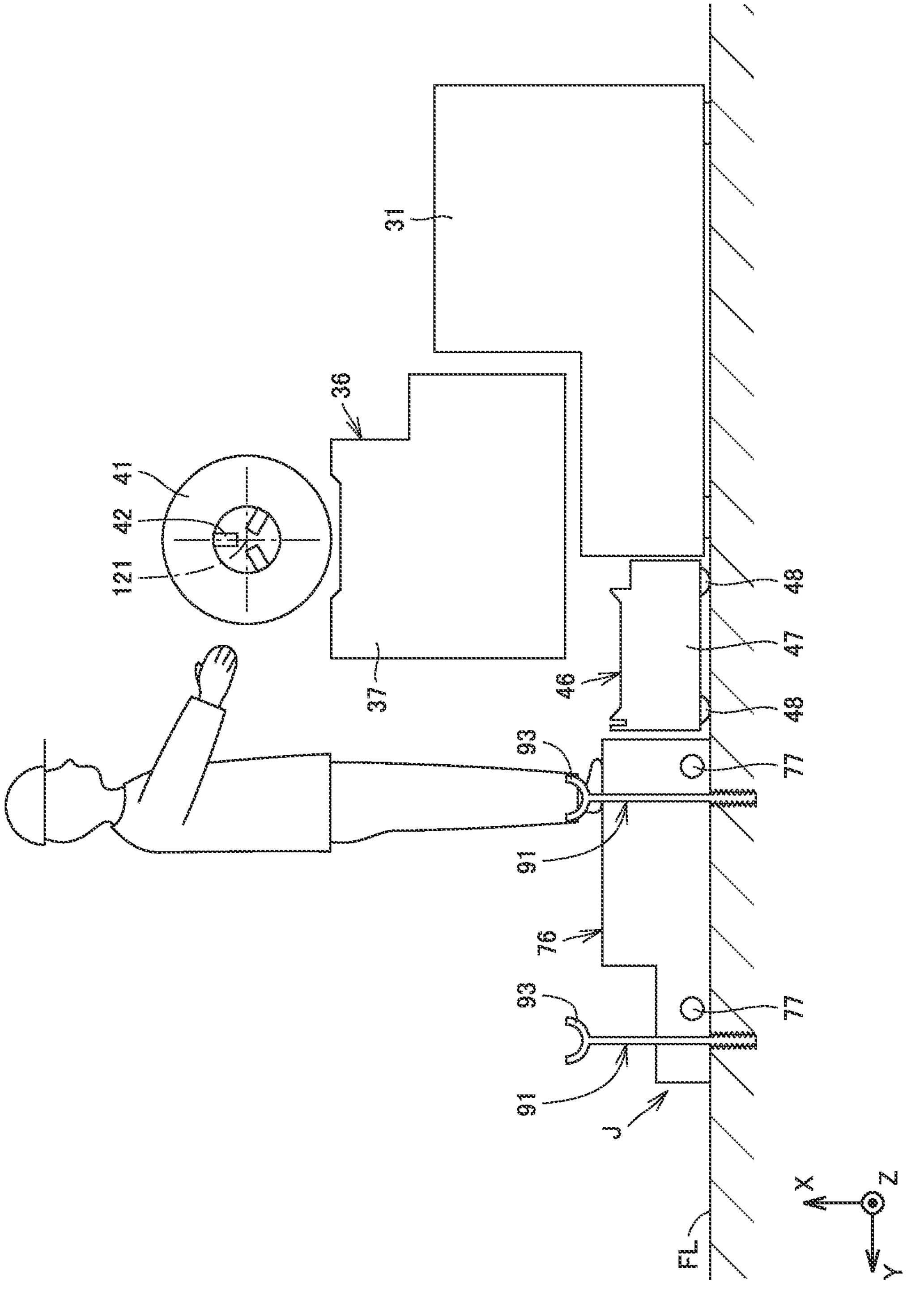
FIG. 7 is a side view illustrating a machine tool according to a second embodiment of the present invention.
Figure 8:
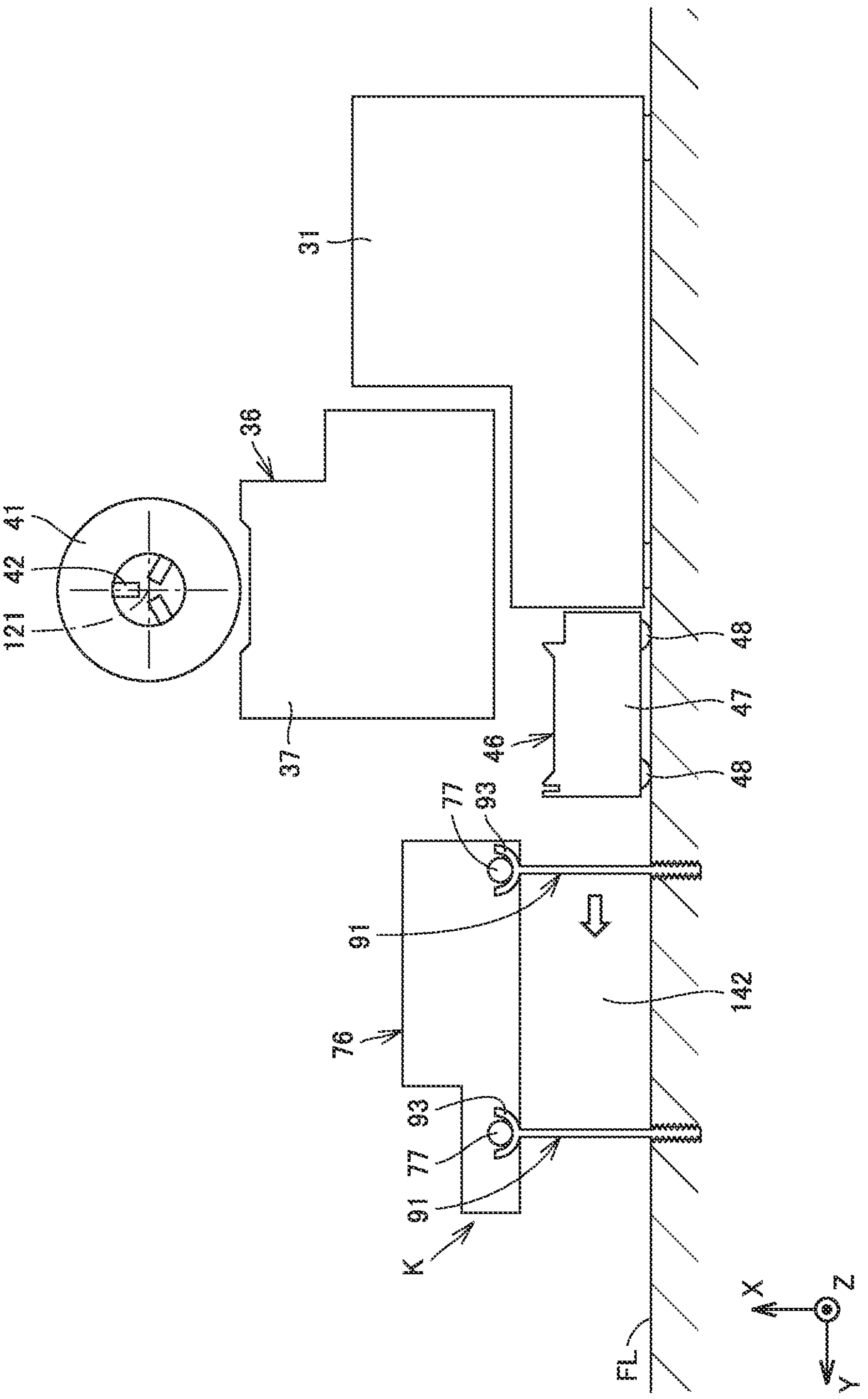
FIG. 8 is another side view illustrating the machine tool according to the second embodiment of the present invention.

FIGS. 7 and 8 are side views illustrating a machine tool according to a second embodiment of the present invention.

The machine tool according to the present embodiment basically has the same configuration as the machine tool 100 according to the first embodiment. Hereinafter, the description of the same components will not be repeated.

With reference to FIGS. 7 and 8, the machine tool according to the present embodiment includes a coolant tank 46 provided in front of the bed 31 in the machine front direction, a foot stool 76 serving as a structure provided at a first position J in front of the coolant tank 46 in the machine front direction, and a plurality of support poles 91 serving as a support member capable of supporting the foot stool 76 retracted from a first position J to a second position K higher than the coolant tank 46.

In the present embodiment, the foot stool 76 is disposed on the floor FL in front of the coolant tank 46 in the machine front direction. The foot stool 76 is disposed opposite to the coolant tank 46 in the Y axis direction.

The support pole 91 has a column shape extending in the vertical direction. A lower end of the support pole 91 is connected to the floor FL. The support pole 91 is provided with a locking member 93. The locking member 93 is provided at an upper end of the support pole 91. The locking member 93 is configured to lock a convex member 77 to be described later. The locking member 93 has a key shape capable of receiving the convex member 77 from below. The support pole 91 is provided at a position opposite to the foot stool 76 in the Z axis direction. The plurality of support poles 91 are provided at positions apart from each other in the Y axis direction and the Z axis direction.

The foot stool 76 is provided with a plurality of convex members 77. The convex member 77 has a convex shape protruding in the Z axis direction. The convex member 77 is provided at a position immediately above the floor FL where the foot stool 76 is disposed. The plurality of convex members 77 are provided in correspondence relationship to the plurality of locking members 93, respectively. The plurality of convex members 77 are provided at equal pitches with the plurality of locking members 93 in the Y axis direction and the Z axis direction.

As illustrated in FIG. 8, the foot stool 76 is lifted upward from the floor FL. The plurality of convex members 77 are respectively locked by the plurality of locking members 93. Thereby, the foot stool 76 is supported by the plurality of support poles 91 upward from the floor FL. Thus, a space 142 for drawing out the coolant tank 46 to the front side of the machine is formed between the floor FL and the foot stool 76.

According to the second embodiment of the present invention configured as described above, it is possible for the machine tool to obtain the same effect as that described in the first embodiment.

It should be understood that the embodiments disclosed herein have been presented for the purpose of illustration and description but not limited in all aspects.

It is intended that the scope of the present invention is not limited to the description above but defined by the scope of the claims and encompasses all modifications equivalent in meaning and scope to the claims.

INDUSTRIAL APPLICABILITY

The present invention is applied to a machine tool including a coolant tank.

REFERENCE SIGNS LIST

21: cover body; 22: first door; 23: second door; 26: magazine cover; 27: side cover; 31: bed; 36: tool rest; 37: tool rest base; 38: pipe; 41: work spindle; 42: chuck claw; 46: coolant tank; 47: tank body; 48: tire; 51: pipe housing box; 55: opposing member; 56, 256: upper surface; 57: internal space; 61: cable bear; 71, 71: support arm; 72: connection member; 76: foot stool; 77: convex member; 81: stopper; 91: support pole; 93: locking member; 100: machine tool; 110: machining area; 121: rotation center axis; 126: rotation center axis; 141, 142, 146: space; J: first position; K: second position

The invention claimed is:

1. A machine tool for machining a workpiece, the machine tool comprising:
- a bed:
- a workpiece spindle configured to rotate the workpiece about a rotation axis;
- a cover body that defines a machining area and that includes a door, the door being slidable in a plane extending parallel to the rotation axis, and the rotation axis extending perpendicular to a machine front direction;
- a coolant tank provided at a third position in front of the bed in the machine front direction;
- a tool rest configured to hold a tool for machining the workpiece;
- a structure which is retractable from a first position to a second position, the first position located in front of the coolant tank in the machine front direction, and the second position located vertically higher than the coolant tank; and
- a support for supporting the structure when the structure is retracted from the first position to the second position,
- the coolant tank being configured to be pulled by a user in the machine front direction from the third position to a fourth position in which the coolant tank is able to incur maintenance when the structure is disposed at the second position,
- the structure including an internal space housing at least one of a wire and a pipe,
- the tool rest being disposed above the coolant tank when the coolant tank is at the third position, and
- the at least one of the wire and the pipe extending from the tool rest to the internal space.

2. The machine tool according to claim 1, wherein
- the structure is connected to the support so as to be operable between the first position and the second position.

3. The machine tool according to claim 2, wherein
- the structure is connected to the support so as to be rotatable about a first axis extending in a longitudinal direction which is perpendicular to the machine front direction.

4. The machine tool according to claim 3, wherein
- the first axis is disposed at a position higher than the coolant tank.

5. The machine tool according to claim 2, wherein
- the structure further includes a restriction member that restricts the motion of the structure from the second position to the first position.

6. The machine tool according to claim 1, wherein
- the structure has an upper surface,
- the upper surface extends in a longitudinal direction which is perpendicular to the machine front direction, and
- the upper surface is a horizontal surface when the structure is positioned at the first position.

7. The machine tool according to claim 6, wherein the rotation axis about which the workpiece is rotated extends in the longitudinal direction, and the upper surface is disposed at a position lower than a second axis and higher than the coolant tank when the structure is positioned at the first position.

8. The machine tool according to claim 1, wherein the coolant tank includes a tank body that has an elongated shape extending in a longitudinal direction, which extends perpendicular to the machine front direction in a top view, and the tank body is configured to store coolant, and the coolant tank includes a tire which is attached to the tank body.

9. The machine tool according to claim 1, wherein the structure has a longitudinal shape which extends in a left-right direction of the machine tool, and the structure has a upper surface on which the user stands to access the machining area.

* * * * *